United States Patent
Cabib et al.

[19]

[11] Patent Number: 6,088,099

[45] Date of Patent: Jul. 11, 2000

[54] METHOD FOR INTERFEROMETER BASED SPECTRAL IMAGING OF MOVING OBJECTS

[75] Inventors: Dario Cabib, Timrat; Robert A. Buckwald, Ramat Yishay, both of Israel

[73] Assignee: Applied Spectral Imaging Ltd., Migdal Haemek, Israel

[21] Appl. No.: 09/091,756

[22] PCT Filed: May 12, 1997

[86] PCT No.: PCT/US97/08153

§ 371 Date: Jun. 19, 1998

§ 102(e) Date: Jun. 19, 1998

[87] PCT Pub. No.: WO98/19293

PCT Pub. Date: May 7, 1998

[30] Foreign Application Priority Data

Oct. 30, 1996 [IL] Israel ........................................ 119520

[51] Int. Cl.[7] .................................................. G01B 9/02
[52] U.S. Cl. .......................................... 356/345; 356/346
[58] Field of Search .............................. 356/346; 382/133

[56] References Cited

U.S. PATENT DOCUMENTS 5,029,220 7/1991 Juday .......................................... 382/6
5,303,709 4/1994 Dreher et al. .
5,784,162 7/1998 Cabib et al. ............................ 356/346

OTHER PUBLICATIONS

Novack, R.L., "Microfiber Refelection Spectrophotometry of Cytochrome Oxidase in the Rat Cerebral Cortex: Relationships Between Brain Oxidative Metabolism and Function Following Direst Cortical Stimulation", Doctoral Dissertation, Univ. Of Miami, Goral Gables, Fla. (1988).

Delori, F.C., "Spectropgotometer for Noninvasive Measurement of Intrinsic Fluorescence and Reflectance of the Ocular Fundus" *Appl. Optics*, 33(31): pp 7439–7452, 1994.

*Primary Examiner*—Robert H. Kim
*Assistant Examiner*—Andrew H. Lee
*Attorney, Agent, or Firm*—Mark M. Friedman

[57] ABSTRACT

A method for spatial registration and spectral correction for interferometer based spectral imaging which can be used to obtain spectral images of a moving object, the method comprising the steps of (a) using an interferometer based spectral imager for acquiring spatial and spectral information of the moving object; and (b) correcting the spatial and spectral information for movements of the moving object via a spatial registration and spectral correction procedures for obtaining corrected spatial and spectral information.

24 Claims, 8 Drawing Sheets

(2 of 8 Drawing Sheet(s) Filed in Color)

METHOD FOR INTERFEROMETER BASED SPECTRAL IMAGING OF MOVING OBJECTS

FIELD AND BACKGROUND OF THE INVENTION

The present invention relates to a method for spectral analysis of objects, i.e., spectral imaging. More particularly the present invention relates to an interferometer based method aimed at spectral imaging of a moving object, to determine the spectral intensity of each pixel thereof. Spectral intensity according to the invention may be due to light emitted (naturally occurring or induced fluorescence) from, reflected or scattered by and/or transmitted through the moving object, all are further referred hereinbelow as light emitted from the object.

Spectroscopy is a well known analytical tool which has been used for decades in science and industry to characterize materials and processes based on the spectral signatures of chemical constituents. The physical basis of spectroscopy is the interaction of light with matter. Traditionally, spectroscopy is the measurement of the light intensity emitted, transmitted, scattered or reflected from an object, as a function of wavelength, at high spectral resolution, but without any spatial information. Spectral imaging, on the other hand, is a combination of high resolution spectroscopy and high resolution imaging (i.e., spatial information).

A spectrometer is an apparatus designed to accept light, to separate (disperse) it into its component wavelengths, and measure the light's spectrum, that is the intensity of the light as a function of its wavelength. An imaging spectrometer, also referred herein as a spectral imager, is one which collects incident light from a scene and measures the spectra of each pixel (i.e., picture element) thereof.

Thus, spectral imaging is a technology which enables the measurement of the spectrum of light emitted from every point (pixel) of an object. A spectral imager is an instrument that measures and stores in memory for later retrieval and analysis the spectrum of light emitted from every point of the object which is placed in its field of view. A spectral image is a collection of spectra of the object measured by a spectral imager. It is usually organized as an intensity function defined in a three dimensional space in which two dimensions are of an image (x and y), and one is of a spectral axis ($\lambda$). As such, a spectral image is usually referred to as a "cube" of data or "spectral cube".

There are three basic types of spectral imaging methods. These are (i) grating based spectral imaging, (ii) filters based spectral imaging (iii) and interferometer based spectral imaging.

In grating based spectral imaging systems, also known as slit-type imaging spectrometers, such as for example the DILOR system: [see, Valisa et al. (September 1995) presentation at the SPIE Conference European Medical Optics Week, BiOS Europe '95, Barcelona, Spain], only one axis of a CCD (charge coupled device) array detector (the spatial axis) provides real imagery data, while a second (spectral) axis is used for sampling the intensity of the light which is dispersed by the grating as function of wavelength. The system also has a slit in the first focal plane, limiting the field of view at any given time to a line of pixels. Therefore, a full image can only be obtained after scanning the grating or the incoming beam in a direction parallel to the spectral axis of the CCD in a method known in the literature as line scanning. The inability to visualize the two-dimensional image before the whole measurement is completed, makes it impossible to choose, prior to making the measurement, a desired region of interest from within the field of view and/or to optimize the system focus, exposure time, etc. Grating based spectral imagers are in use for remote sensing applications, because an airplane (or satellite) flying over the surface of the Earth provides the system with a natural line scanning mechanism.

It should be further noted that slit-type imaging spectrometers have a major disadvantage since most of the pixels of one frame are not measured at any given time, even though the fore-optics of the instrument actually collects incident light from all of them simultaneously. The result is that either a relatively large measurement time is required to obtain the necessary information with a given signal-to-noise ratio (sensitivity), or the signal-to-noise ratio is substantially reduced for a given measurement time. Furthermore, slit-type spectral imagers require line scanning to collect the necessary information for the whole scene. which may introduce inaccuracies to the results thus obtained.

Filters based spectral imaging methods can be further categorized into discrete filters and tunable filters. In these types of imaging spectrometers the spectral image is built by filtering the radiation for all the pixels of the scene simultaneously at a different wavelength at a time by inserting in succession narrow band filters in the optical path, or by electronically scanning the bands using acousto-optic tunable filters (AOTF) or liquid-crystal tunable filter (LCTF), see below. Similarly to the slit type imaging spectrometers equipped with a grating as described above, while using filter based spectral imaging methods, most of the radiation is rejected at any given time. In fact, the measurement of the whole image at a specific wavelength is possible because all the photons outside the instantaneous wavelength (band) being measured are rejected and do not reach the CCD.

Tunable filters, such as AOTFs and LCTFs have no moving parts and can be tuned to any particular wavelength in the spectral range of the device in which they are implemented. One advantage of using tunable filters for spectral imaging is their random wavelength access; i.e., the ability to measure the intensity of an image at a number of wavelengths, in any desired sequence without the use of a filter wheel. However, AOTFs and LCTFs have the disadvantages of (i) limited spectral range (typically, $\lambda_{max}=2\lambda_{min}$) while all other radiation that falls outside of this spectral range must be blocked, (ii) temperature sensitivity, (iii) poor transmission, (iv) polarization sensitivity, and (v) in the case of AOTFs an effect of shifting the image during wavelength scanning.

All these types of filter and tunable filter based systems have not been used successfully and extensively over the years for spectral imaging, because of their limitations in spectral resolution, low sensitivity, and lack of easy-to-use, non-sophisticated algorithms for interpreting and displaying the collected data.

The sensitivity advantage that interferometer based spectroscopy has over the filter and grating methods is known in the art as the multiplex or Fellgett advantage [see, Chamberlain (1979) The principles of interferometric spectroscopy, John Wiley and Sons, pp. 16–18 and p. 263].

A method and apparatus for spectral imaging which have advantages in the above respects are disclosed in U.S. Pat. No. 5,539,517, to Cabib et al., issued Jul. 23, 1996, which is incorporated by reference as if fully set forth herein, with the objective to provide a method and apparatus for spectral imaging which better utilizes all the information available from the collected incident light of the image to substantially decrease the required frame time and/or to substantially increase the signal-to-noise ratio, as compared to the conventional slit- or filter type imaging spectrometer.

According to this invention, there is provided a method of analyzing an optical image of a scene to determine the spectral intensity of each pixel thereof by collecting incident light from the scene; passing the light through an interferometer which outputs modulated light corresponding to a predetermined set of linear combinations of the spectral intensity of the light emitted from each pixel; focusing the light outputted from the interferometer on a detector array, scanning the optical path difference (OPD) generated in the interferometer for all pixels independently and simultaneously and processing the outputs of the detector array (the interferograms of all pixels separately), to determine the spectral intensity of each pixel thereof.

This method may be practiced by utilizing various types of interferometers wherein the OPD is varied to build the interferograms by moving the entire interferometer, an element within the interferometer, or the angle of incidence of the incoming radiation. In all of these cases, when the scanner completes one scan of the interferometer, the interferograms for all pixels of the scene are completed.

Apparatuses in accordance with the above features differ from the conventional slit- and filter type imaging spectrometers by utilizing an interferometer as described above, therefore not limiting the collected energy with an aperture or slit or limiting the incoming wavelength with narrow band interference or tunable filters, thereby substantially increasing the total throughput of the system. Thus, these interferometer based spectral imaging systems better utilize all the information available from the incident light of the scene to be analyzed, thereby substantially decreasing the measuring time and/or substantially increasing the signal-to-noise ratio (i.e., sensitivity).

FIG. 1 is a block diagram illustrating the main components of a prior art interferometer based imaging spectrometer disclosed in U.S. Pat. No. 5,539,517.

This imaging spectrometer is constructed highly suitable to implement the method of the present invention as it has high spectral (Ca. 4–16 nm depending on wavelength) and spatial (Ca. 30/M μm where M is the effective microscope or fore optics magnification) resolutions.

Thus, the prior art imaging spectrometer of FIG. 1 includes: a collection optical system, generally designated 20; a one-dimensional scanner, as indicated by block 22; an optical path difference (OPD) generator or interferometer, as indicated by block 24; a one-dimensional preferably two-dimensional detector array, as indicated by block 26; and a signal processor and display, as indicated by block 28.

A critical element in system 20 is the OPD generator or interferometer 24, which outputs modulated light corresponding to a predetermined set of linear combinations of the spectral intensity of the light emitted from each pixel of the scene to be analyzed. The output of the interferometer is focused onto the detector array 26. Thus, all the required optical phase differences are scanned simultaneously for all the pixels of the field of view, in order to obtain all the information required to reconstruct the spectrum. The spectra of all the pixels in the scene are thus collected simultaneously with the imaging information, thereby permitting analysis of the image in a real-time manner.

The apparatuses according to U.S. Pat. No. 5,539,517 may be practiced in a large variety of configurations. Specifically, the interferometer used may be combined with other mirrors as described in the relevant Figures of U.S. Pat. No. 5,539,517.

Thus, according to U.S. Pat. No. 5,539,517, alternative types of interferometers may be employed. These include but are not limited to (i) a moving type interferometer, in which the OPD is varied to modulate the light, namely, a Fabry-Perot interferometer with scanned thickness; (ii) a Michelson type interferometer, which includes a beamsplitter receiving the beam from an optical collection system and a scanner, and splitting the beam into two paths; (iii) a Sagnac interferometer optionally combined with other optical means, in which interferometer the OPD varies with the angle of incidence of the incoming radiation, such as the four-mirror plus beamsplitter interferometer as further described in the cited U.S. patent (see for example FIG. 14 there).

FIG. 2 illustrates an imaging spectrometer constructed in accordance with U.S. Pat. No. 5,539,517 utilizing an interferometer in which the OPD varies with the angle of incidence of the incoming radiation. A beam entering the interferometer at a small angle to the optical axis undergoes an OPD which varies substantially linearly with this angle.

In the interferometer of FIG. 2, all the radiation from source 30 in all the pixels, after being collimated by an optical collection system 31, is scanned by a mechanical scanner 32. The light is then passed through a beamsplitter 33 to a first reflector 34 and then to a second reflector 35, which reflects the light back through the beamsplitter 33 and then through a focusing lens 36 to an array of detectors 37 (e.g., a CCD). This beam interferes with the beam which is reflected by beamsplitter 33, then by second reflector 35, and finally by first reflector 34.

At the end of one scan, every pixel has been measured through all the OPD's, and therefore the spectrum of each pixel of the scene can be reconstructed by Fourier transformation. A beam parallel to the optical axis is compensated, and a beam at an angle ($\theta$) to the optical axis undergoes an OPD which is a function of the thickness of the beamsplitter 33, its index of refraction, and the angle $\theta$. The OPD is proportional to $\theta$ for small angles. By applying the appropriate inversion, and by careful book-keeping, the spectrum of every pixel is calculated.

In the configuration of FIG. 2 the ray which is incident on the beamsplitter at an angle $\beta$ ($\beta$=45° in FIG. 2) goes through the interferometer with an OPD=0, whereas a ray which is incident at a general angle $\beta$−$\theta$ undergoes an OPD given by Equation 1:

$$OPD(\beta,\theta,t,n)=t[(n^2-\sin^2(\beta+\theta))^{0.5}-(n^2-\sin^2(\beta-\theta))^{0.5}+2\sin\beta\sin\theta] \quad (1)$$

where $\beta$ is the angle of incidence of the ray on the beamsplitter; $\theta$ is the angular distance of a ray from the optical axis or interferometer rotation angle with respect to the central position; t is the thickness of the beamsplitter; and n is the index of refraction of the beamsplitter.

It follows from Equation 1 that by scanning both positive and negative angles with respect to a central position, one can get a double-sided interferogram for every pixel, which helps eliminate phase errors giving more accurate results in the Fourier transform calculation.

The scanning amplitude determines the maximum OPD reached, which is related to the spectral resolution of the measurement. The size of the angular steps determines the OPD step which is, in turn, dictated by the shortest wavelength to which the system is sensitive. In fact, according to the sampling theorem [see, Chamberlain (1979) The principles of interferometric spectroscopy, John Wiley and Sons, pp. 53–55], this OPD step must be smaller than half the shortest wavelength to which the system is sensitive.

Another parameter which should be taken into account is the finite size of a detector element in the matrix. Through the focusing optics, the element subtends a finite OPD in the interferometer which has the effect of convolving the interferogram with a rectangular function. This brings about, as a consequence, a reduction of system sensitivity at short wavelengths, which drops to zero for wavelengths equal to or below the OPD subtended by the element. For this reason, one must ensure that the modulation transfer function (MTF) condition is satisfied, i.e., that the OPD subtended by a detector element in the interferometer must be smaller than the shortest wavelength at which the instrument is sensitive.

Thus, imaging spectrometers constructed in accordance with the invention disclosed in U.S. Pat. No. 5,539,517 do not merely measure the intensity of light coming from every pixel in the field of view, but also measure the spectrum of each pixel in a predefined wavelength range. They also better utilize all the radiation emitted by each pixel in the field of view at any given time, and therefore permit, as explained above, a significant decrease in the frame time and/or a significant increase in the sensitivity of the spectrometer. Such imaging spectrometers may include various types of interferometers and optical collection and focusing systems, and may therefore be used in a wide variety of applications. including medical diagnostic and therapy and biological research applications, as well as remote sensing for geological and agricultural investigations, and the like.

An imaging spectrometer in accordance with the invention disclosed in U.S. Pat. No. 5,539,517 was developed by Applied Spectral Imaging Ltd., Industrial Park, Migdal Haemek, Israel and is distributed under the name SpectraCube™.

The SpectraCube™ system optically connected to a variety of optical devices is used to implement the method of the present invention. The SpectraCube™ system has the following characteristics, listed hereinbelow in Table 1:

TABLE 1

| Character | Performance |
|---|---|
| Spatial resolution: | 30/M μm (M = effective microscope or fore optics magnification) |
| Field of View: | 15/M millimeters |
| Sensitivity: | 20 milliLux (for 100 msec integration time, increases for longer integration times linearly with √T) |
| Spectral range: | 400–1000 nm |
| Spectral resolution: | 4 nm at 400 nm (16 nm at 800 nm) |
| Acquisition time: | 5–50 sec, typical 25 sec |
| FFT processing time: | 20–180 sec, typical 60 sec |

However, since an interferometer based spectral imager, in order to perform a measurement, must collect several frames of an examined object in a period of time that varies from Ca. 5 to 60 seconds, a considerably longer period of time as compared with a camera or video camera snapshot, spectral imaging of moving objects results in blurring of the image of the object and in disrupting the algorithm used to calculate the spectrum of each pixel thereof.

Indeed, while using the device disclosed in U.S. Pat. No. 5,539,517 one should ensure that the examined object is substantially stationary for best results. This is indeed the case in many applications, such as when spectral imaging is used for color karyotyping and color banding of chromosomes as disclosed in Schroeck et al. (1996) Multicolor spectral karyotyping of human chromosomes. Science 273:494–497. However, in other applications spectral imaging of a moving object is required. This is the case for example when the examined object is an organ of a living creature (e.g., a human eye or a specific region or tissue thereof).

Spectral images of living organs and tissues can provide important information concerning the chemical makeup of the organ or tissues and thereby provide information concerning for example their metabolic functioning. This is the case since spectroscopy is capable of characterizing objects based on their spectral signatures of chemical constituents, as the physical basis of spectroscopy is the interaction of light with matter.

For example various body substances such as but not limited to hemoglobin, cytochromes, flavins, nicotinamide adenine dinucleotide, nicotinamide adenine dinucleotide phosphate and the like may be in either reduced or oxidized forms, each of the forms of each of these substances is characterized by an identifying unique spectrum. Since the oxidation level (i.e., the ratio of the oxidized and reduced forms) of such substances is in many cases correlated to the amount of oxygen arriving at the organ and the level of metabolism, and since changes in the oxidation level are in some cases indicative of a pathological condition, determination of the oxidation level of such substances has been employed using point spectroscopy to determine and estimate the severity of such pathological conditions. One example in which a point spectrophotometer was used for noninvasive measurements of the ocular fundus is described by Delori (1994) Applied Optics 33:7439–7452. However, point spectroscopy is limited as it provides spectral information which is not correlated with spatial information, the way spectral imaging does.

Nevertheless, any attempt to measure a spectral image of a living organ, which organ is not motionless, will result in artifacts and a distorted or particularly noisy spectral image data. If such an image is acquired using filter or grating based spectral imagers, a spatial image registration procedure will be required for best results. Nevertheless, these spectral imagers suffer the above listed limitations. On the other hand, should such an image be acquired by an interferometer based spectral imager which have numerous advantages over other spectral imaging systems, not only spatial registration but also spectral correction will be required.

Thus, the object of the present invention is to provide an interferometer based spectral imaging method by which a spectral image can be measured also in the case where the measured object is not stationary. The modifications the method requires for operation, as compared with the prior art described above, are mostly in the mathematical algorithms used to process the data collected from the moving object, and in some cases also in the way the device is aligned with respect to the examined moving object, which modifications provide both spatial registration and spectral correction.

SUMMARY OF THE INVENTION

According to the present invention there is provided a method for spatial registration and spectral correction for interferometer based spectral imaging which can be used to obtain spectral images of moving objects.

According to further features in preferred embodiments of the invention described below, provided is a method for spectral imaging of a moving object comprising the steps of (a) using an interferometer based spectral imager for acquiring spatial and spectral information of the moving object; and (b) correcting the spatial and spectral information for movements of the moving object via a spatial registration and spectral correction procedures for obtaining corrected spatial and spectral information.

According to still further features in the described preferred embodiments the method further comprising the step of (c) presenting the corrected spatial and spectral information as an image.

According to still further features in the described preferred embodiments the presentation is an RGB display of the corrected spectral information according to the corrected spatial information.

According to still further features in the described preferred embodiments the spatial registration procedure is effected using a fringe suppression algorithm.

According to still further features in the described preferred embodiments the acquisition of spatial and spectral information is effected by (a) collecting incident light from the moving object; (b) passing the collected light through the interferometer which outputs modulated light corresponding to a predetermined set of linear combinations of the spectral intensity of the light emitted from each pixel of the moving object; (c) focusing light outputted from the interferometer on a detector array; (d) scanning the optical path difference generated in the interferometer for all the pixels of the moving object independently and simultaneously; and (e) processing the outputs of the detector array, to determine the spectrum of each of the pixels of the moving object.

According to still further features in the described preferred embodiments the spatial registration and spectral correction procedures for obtaining the corrected spatial and spectral information are effected by selecting a reference frame of the moving object, using the reference frame of the moving object for calculating a translation vector for any other frame of the moving object and using the translation vectors for effecting the spatial registration and spectral correction procedures.

According to still further features in the described preferred embodiments the calculation is effected by overlapping the reference frame with any of the other images to find a position in which an intensity subtraction procedure yields a substantially featureless subtraction image.

According to still further features in the described preferred embodiments the moving object moves substantially only along a first direction, and the interferometer is of a type in which the optical path difference in a frame varies along a single direction, the method further comprising the step of (c) positioning the spectral imager with respect to the moving object such that its optical path difference gradient is perpendicular to the first direction.

According to still further features in the described preferred embodiments provided is a method for spectral imaging of a moving object comprising the steps of (a) aligning and focusing an interferometer based spectral imager with respect to the moving object; (b) scanning the interferometer while acquiring and storing successive frames of the moving object by a detector array, so that successive optical path differences of the interferometer are inherently not equally spaced due to movements of the moving object; (c) ordering collected data of each of the successive frames for every pixel of the moving object into an interferogram function, while at the same time, calculating a spatial translation vector of each of the successive frames with respect to one of the successive frames which is taken as a reference frame, such that the actual optical path difference for every pixel in each of the successive frames is found; (d) calculating a complex Fourier transform for each pixel of the object by applying a straightforward Fourier transform algorithm to each of the interferograms; and (e) calculating a spectrum for every pixel of the moving object.

According to still further features in the described preferred embodiments provided is a method for spectral imaging of a moving object comprising the steps of (a) aligning and focusing an interferometer based spectral imager with respect to the moving object; (b) scanning the interferometer while acquiring and storing successive frames of the moving object by a detector array, so that successive optical path differences of the interferometer are inherently not equally spaced due to movements of the moving object; (c) ordering collected data of each of the successive frames for every pixel of the moving object into an interferogram function while at the same time calculating a spatial translation vector of each of the successive frames with respect to one of the successive frames which is taken as a reference frame, such that the actual optical path difference for every pixel in each of the successive frames is found; (d) interpolating the interferogram of each of the pixels of the moving object to achieve equally spaced optical path difference values; (e) calculating a complex Fourier transform for each of the pixels of the moving object by applying a fast Fourier transform algorithm to each of the interferograms; and (f) calculating a spectrum for every pixel of the moving object.

According to still further features in the described preferred embodiments the method further comprising the step of presenting an image of the moving object.

According to still further features in the described preferred embodiments the presentation is an RGB display of the calculated spectra.

According to still further features in the described preferred embodiments the calculation of the spatial translation vector of each of the successive frames with respect to one of the successive frames which is taken as a reference frame is effected by overlapping the reference frame with any of the other images to find a position in which an intensity subtraction procedure yields a substantially featureless subtraction image.

According to still further features in the described preferred embodiments the moving object moves substantially only along a first direction, and the interferometer is of a type in which the optical path difference in a frame varies along a single direction, the method further comprising the step of positioning the spectral imager with respect to the moving object such that its optical path difference gradient is perpendicular to the first direction.

According to still further features in the described preferred embodiments the moving object is a living organ or a portion thereof.

According to still further features in the described preferred embodiments the living organ is an eye.

The present invention successfully addresses the shortcomings of the presently known configurations by providing an interferometer based spectral imaging method which permits measuring a spectral image of a non-stationary object by applying spatial registration and spectral correction protocols to the conventional Fourier transform protocol.

BRIEF DESCRIPTION OF THE DRAWINGS

The file of this Patent contains at least one drawing executed in color.

The invention herein described, by way of example only, with reference to the accompanying drawings, wherein:

FIG. 4a presents a portion of an interferogram function of a given pixel derived from the spectral image of FIG. 3a;

DESCRIPTION OF THE PREFERRED EMBODIMENTS

Figure 1:
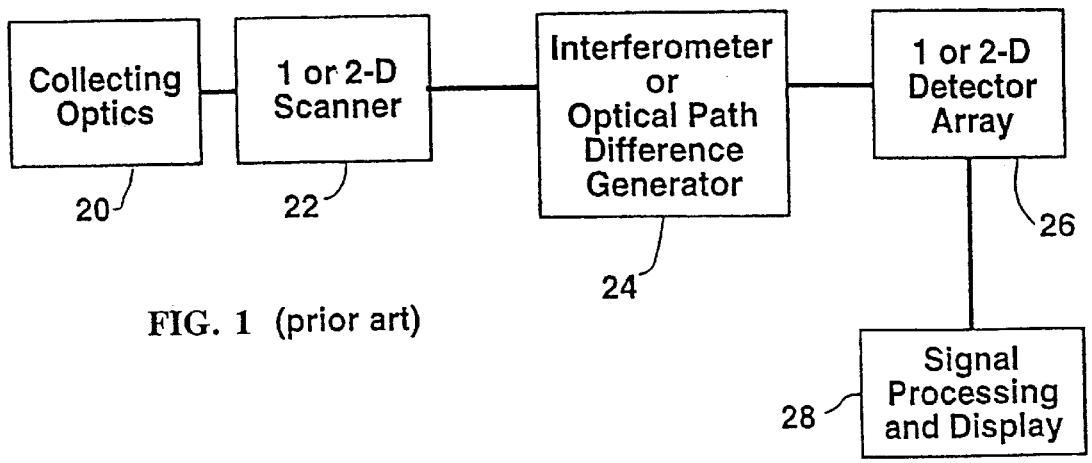
FIG. 1 is a block diagram illustrating the main components of an imaging spectrometer constructed in accordance with U.S. Pat. No. 5,539,517 (prior art)

The present invention is of a method for spatial registration and spectral correction for interferometer based spectral imaging which can be used to obtain spectral images of moving objects. Specifically, the present invention can be used to obtain spectral images of living organs and/or tissues such as the human eye.

The principles and operation of a method according to the present invention may be better understood with reference to the drawings and accompanying descriptions.

U.S. Pat. No. 5,539,517 and other publications [e.g., (i) Schroeck et al. (1996) Multicolor spectral karyotyping of human chromosomes. Science 273:494–497; (ii) Malik et al. (1996) Fourier transform multipixel spectroscopy for quantitative cytology. J. of Microscopy 182:133–140; (iii) Malik and Dishi (1995) ALA mediated PDT of melanoma tumors: light-sensitizer interactions determined by a novel spectral imaging system. Proceedings of optical methods for tumor treatment and detection: Mechanisms and techniques in photodynamic therapy IV, Feb. 4–5, 1995, San Jose, Calif., SPIE Vol. 2392, pp. 152–158; (iii) Malik et al. (1994) A novel spectral imaging system combining spectroscopy with imaging application for biology. Proceedings of optical and imaging techniques in biomedicine, Sep. 8–9, 1994, Lille, France, SPIE Vol. 2329, pp. 180–184; (iv) Malik et al. (1996) Fourier transform multiplex spectroscopy and spectral imaging of photoporphyrin in single melanoma cells. Photochemistry and photobiology 63:608–614; and (v) Soenksen et al. (1996) Use of novel bio-imaging system as an imaging oximeter in intact rat brain. Proceedings of advances in laser and light spectroscopy to diagnose cancer and other diseases III, Jan. 29–30, 1996, San Jose Calif., SPIE Vol. 2679, pp. 182–189] teach spectral imaging devices and methods, in which the light from a surface of an examined object is collected by an optical aperture or field lens, passed through an interferometer, in which it is split into two coherent rays, and then it is focused by focusing optics onto a two-dimensional detector array device (e.g. a CCD in the UV to visible range) having a surface of detector elements, such that the detector's surface represents a real image of the object's surface.

The signals from each and all detector elements of the detector array, as obtained from many successive frames of the detector array, are recorded, while the interferometer is scanned in synchronization with the detector frames.

Since at each position of the interferometer, the optical path difference (OPD) between the two split beams through which a detector element sees its corresponding picture element (pixel) varies in a known way, at the end of the scan, the signals collected for each pixel form a function called interferogram. which is the intensity of light as function of the optical path difference (OPD) for that particular pixel. Because the interferometer speed is constant, the CCD frame time is constant and the OPD is proportional to the interferometer angular position. the OPD samples are equally spaced.

According to the well known teachings of the Fourier transform spectroscopy, the mathematical Fourier transform operation applied to this interferogram function yields a spectrum, i.e., the intensity of light in every wavelength emitted by the pixel in question.

Since interferogram functions are known for every pixel of the object's surface, spectra can be calculated and known for every pixel thereof, by applying the Fourier transformation to all of the interferograms thus collected.

U.S. Pat. No. 5,539,517 teach several embodiments of spectral imaging devices and methods, each is capable of measuring a spectral image of an object. which devices differ from one another in the type of interferometer used therein.

It is well known that, in general, no matter what interferometer is used, at any one position of the interferometer scan, the OPD is different for an on-axis and an off-axis ray, and as a consequence, the OPD differs from pixel to pixel in the same frame.

For example, as explained in "The principles of interferometric spectroscopy" by John Chamberlain, John Wiley & Sons, 1979, page 220. Equations 8.3 and 8.4b, in a Michelson interferometer the OPD varies according to the following Equation (2):

$$OPD = \frac{\lambda/2}{(1-\cos\alpha)} \quad (2)$$

where $\lambda$ is the wavelength of light, and $\alpha$ is the angle between the on-axis and the off-axis rays.

According to Equation 2, the OPD dependence on the specific pixel is relatively low. In fact, in Equation 2, $\alpha$ is a small angle, and therefore the term $(1-\cos\alpha)$ varies slowly as $\alpha^2$.

Figure 2:
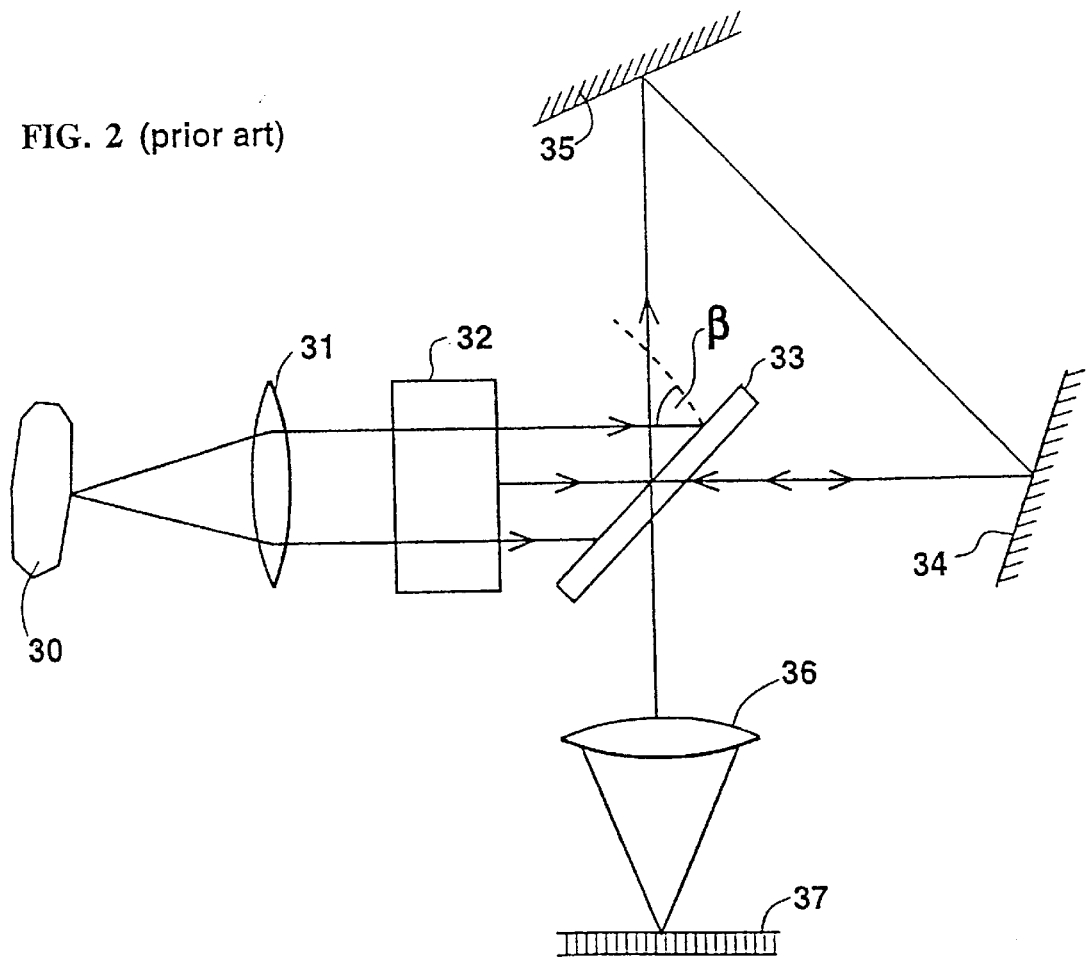
FIG. 2 illustrates a Sagnac interferometer, as used in an imaging spectrometer in accordance with U.S. Pat. No. 5,539,517 (prior art)

However, in a triangular interferometer such as that shown in FIG. 2, the OPD varies faster, i.e., linearly with the projection of the angle of incidence of the ray in the horizontal direction (equivalent to the projection of the distance of the corresponding pixel from the center of the image in the horizontal direction) as shown in Equation 31 in column 13 of U.S. Pat. No. 5,539,517.

This fact has two important consequences for an interferometer based spectral imager.

First, one has to keep track of the OPD for every pixel and every detector frame, so that at the end of the scan, it is possible to reconstruct the spectrum through the Fourier Transform algorithm. This is done by knowing (i) the interferometer position for every frame and (ii) the pixel position in the image.

Second, should the examined object move during the measurement, the spatial registration of the various frames is lost, and the actual OPD of each pixel in each frame is different than it would have been should the object be still.

Thus, if a spectral image of that object is calculated while neglecting its movements during the measurement, and the object is displayed using the collected data, for example via a Red-Green-Blue (RGB) function defined over some or all the spectral range, then (i) the image will look blurred due to loss of spatial registration during the measurement, and (ii) the calculated spectra will not represent the actual spectra, these spectra will look very noisy and not consistent due to the use of incorrect (i.e., non-registered) OPDs in the Fourier transformation. These phenomena are further exemplified in the Examples section below.

Before turning to the description of the method for spatial registration and spectral correction for interferometer based spectral imaging which can be used to obtain spectral images of moving objects according to the teachings of the present invention, the prior art method for measurement of a stationary object will be described.

Thus, a measurement of a stationary objects include the following steps.

First, the spectral imaging device is aligned and focused with respect to the examined object.

Second, the interferometer is scanned in equally spaced OPD steps, while acquiring and storing successive frames of the object by the CCD.

Third, the data is ordered (e.g., by a software) into an interferogram function for every pixel of the object's image.

Fourth, preferably some well known preprocessing steps called windowing or apodization (see, Chamberlain (1979) The principles of interferometric spectroscopy, John Wiley and Sons, pp. 131 and following pages) are performed, in order to regularize the data such that the data of the measurement, which is a discrete and finite set of data, can be used instead of a theoretical continuous interferogram function.

Fifth, "zero filling" procedure is typically performed, such that the number of data for each interferogram is completed to a number of points which equals a power of two of the original number of data, in order to fill-in the spectrum with more interpolated points and to use fast Fourier transform algorithms (see, Chamberlain (1979) The principles of interferometric spectroscopy, John Wiley and Sons, pp. 311 and following pages).

Sixth, the complex (real and imaginary parts) Fourier transforms are calculated by applying the fast Fourier transform algorithm on each of the interferograms. Alternatively, yet less preferably, a straight Fourier transform algorithm is applied. In the latter case "zero filling" is not required.

Seventh, the spectrum of every pixel is calculated as the module (length) of the complex function so obtained, a function defined on discrete values of a conjugate parameter to the OPD, the wavenumber $\sigma$, which in turn is the reciprocal of the wavelength: $\sigma=1/\lambda$.

The fast Fourier transform algorithm reduces very considerably the calculation time but it can be used only when the OPD's are equally spaced and when the number of points in which the interferogram is defined equals to a power of two. For this reason the straightforward Fourier transform algorithm is generally not used.

The method for spatial registration and spectral correction for interferometer based spectral imaging which can be used to obtain spectral images of moving objects according to the present invention is now described.

The following description concerns an object that moves rigidly and linearly on a plane substantially perpendicular to the line of sight of the imager in a random or non-random movement. In other words the object moves in such a way that all of its parts keep their shape and size, and their relative distances, as seen through the spectral imager.

Thus, in the case of a rigidly moving object in random directions without changing plane, (i.e., without getting closer or farther from the instrument, so that the object remains in focus), the measurement steps according to the method of the present invention are as follows.

First, the spectral imaging device is aligned and focused with respect to the examined object.

Second, the interferometer is scanned in synchronization with the CCD frames and constant speed, while acquiring and storing successive frames of the object by the CCD. However, contrary to the above prior art description, due to the object's movements, the resulting OPD steps are inherently not equally spaced as described above. The difference between successive OPD's is now random: it is the result of the combined motion of the interferometer and of the object, it can increase or decrease depending on the instantaneous position and velocity of the object with respect to the position and velocity of the interferometer, it can even be negative (meaning decreasing OPD from a data point to the next) and, if the movement is larger than the field of view, or the movement is a sudden displacement larger than the field of view with immediate return to the previous position, a data point can be missing altogether. In some regions of the OPD axes the data points will be dense, in other they will be sparse.

Third, the data is ordered (e.g., by a software) into an interferogram function for every pixel of the image. However, now the book-keeping is more complicated. In order to accomplish this step one must first find the spatial translation vector of all the frames measured, with respect to a frame taken as reference. This way the actual OPD for every pixel in each frame can be found. Since this is a crucial step of the method according to the present invention it is described in more detail hereinbelow.

Fourth, preferably some well known preprocessing steps called windowing or apodization are performed, in order to regularize the data such that the data of the measurement which is a discrete data can be used instead of a theoretical continuous interferogram function.

Fifth, here the method splits into two alternative branches. According to the first, the measured interferogram of each pixel is not further interpolated and will be used with a straightforward Fourier transform algorithm to calculate its corresponding Fourier transform, whereas, according to the second, the measured interferogram of each pixel is interpolated to achieve OPD values which are equally spaced, and will be used with a fast Fourier transform algorithm to calculate its Fourier transform. Each alternative has advantages and disadvantages. Speed is higher in the latter but, as interpolation introduces errors, reliability of the data is higher in the former.

Sixth, a complex (real and imaginary) Fourier transform for each pixel is calculated by applying the straightforward or fast Fourier transform algorithms to each of the interferograms, depending on alternative choice made under the fifth step above.

Seventh, the spectrum of every pixel is calculated as the module (length) of the complex function so obtained, a function defined on discrete values of the conjugate parameter to the OPD, the wavenumber $\sigma$.

For further details about the theory of Fourier transformation and the mathematical steps for computing the mathematical spectrum as an approximation to the real physical spectrum, starting from the measured interferogram, the reader is referred to textbooks such as Chamberlain (1979) The principles of interferometric spectroscopy, John Wiley and Sons, which is incorporated by reference as if fully set forth herein.

In some highlights of chapters 2, 4, 5 and 6 of Chamberlain (1979) the following basics of the Fourier transform manipulation and relevant considerations are described. The Fourier integral relation between a function f(k) and its Fourier transform F(x) is shown on page 31. In principle, f(k) and F(x) are continuous functions of their variable, but in practice they are always known for discrete values, so that the Fourier integral is approximated by an infinite sum as shown on page 55. The infinite sum is in turn substituted with a finite sum as shown on page 57. The perfect and practical interference functions in the case of electromagnetic radiation are derived as shown on pages 96 and 104. The relation between the physical spectrum and the mathematical spectrum is shown on page 127, and the theory of sampling and correction of phase errors are shown in sections 6.7 to 6.1 1. Finally, the Fast Fourier Transform algorithm is detailed in chapter 10, and is shown to operate only when the discrete intervals are all equal, yet this operation is faster than the straight Fourier summation.

It will be appreciated by one ordinarily skilled in the art that the third step of the method according to the present invention described hereinabove can be accomplished in many alternative ways. One of these alternatives is as follows.

First, one of the frames is defined as a reference frame. In principle it is not important which frame is selected as the reference. In practice, however, it is better to select a frame which is roughly centered with respect to the set of translation vectors, so that the overall spatial overlap between the selected frame and all the other frames is maximized. Thus selecting the reference frame assists in finding the translation vectors for each of the frames measured.

Second, a subtraction image which is the difference in intensity between a first frame and the reference frame is displayed.

Third, the first frame is moved in small steps to the right-left and up-down directions while always displaying the intensity difference, until a position in which the displayed subtraction image is substantially zero everywhere, or has substantially no features, is found. In the ideal case, in which the movement is completely rigid, the subtraction image equals zero at all pixels of overlap. In practice, however, there will always be a slight pattern, and then the best position is the one in which this pattern is minimized in intensity. Experience proved that it is quite easy to find the substantially zero position by eye, because a slight lack of spatial registration emphasizes the differences between two frames, which are therefore easy to detect. This procedure can be automated using various known algorithms, see for example Anil K. Jain (1989) Fundamentals of digital image processing. Prentice-Hall International and system sciences science, pp. 400–402. However, due to the presence of fringes superimposed on the frames, it is preferred that a fringe suppression algorithm is employed prior to automatic spatial registration of the frames, as further described and exemplified under Example 4, below.

Fourth, the translation vector for the first frame is recorded.

Fifth, the procedure is repeated for all additional frames of the measurement.

And finally, knowing the OPD dependence on position (it is a specific dependence for every interferometer), the OPD vector for every pixel in every frame is calculated and stored.

Problems which may arise during measurement and which affect the final results are mostly associated with the amplitude of the object's movement. For the method according to the invention to be useful, the amplitude of the movement is preferably not too large. In particular a number of possible problems may arise.

First, entire regions of the interferogram maybe missing, making it very difficult to interpolate (in the case of interpolation).

Second, if the central portion of the interferogram is completely missing, the Fourier transform cannot be calculated.

And finally, if due to the movement of the examined object the actual OPD steps (after correction for the movement) are larger than the Nyquist condition (one half the lowest wavelength of sensitivity of the instrument), spurious results may be introduced.

Nevertheless, corrective actions may be undertaken, some of which are listed hereinbelow.

First, in a case where the central portion is present, it is usually easy to find the center of the interferogram. In this case, if the interferogram is symmetric, data points on one side of it can be reflected to the other side, filling holes in the process.

Second, take the smallest OPD steps compatible with the needed spectral resolution and measurement time. This again will have the tendency of not allowing large holes in the interferogram.

Third, repeat the interferometer scan two or three times and then join the data as if measured in one measurement. Thus, if an OPD is missing in one of the scans, chances are (for random movement) that it will not be missing in another.

Fourth, in an interferometer in which the OPD in a frame varies in one direction only (e.g., horizontal), and if the movement of the object is in one direction only (e.g., the human eye displays preferentially involuntary horizontal movements), make sure the instrument is rotated around the optical axis, so that the OPD gradient is perpendicular to the direction of the object movements. This way the movements affect only the spatial registration of the frames and the interferograms stay almost unaffected, reducing significantly one source for errors.

Fifth, in the case of a featureless object, it is expected that a movement will not affect the results significantly, since all pixels are equivalent in any case.

And finally, the following distinctions should be made: (i) an object that moves rigidly and linearly on a plane, i.e., the object moves such that all of its parts keep their shape and size, and their relative distances remain constant as seen through the spectral imager, and (ii) an object that moves linearly on a plane, such that all of its parts keep their shape and size, but the relative distances of the parts may vary in time. Obviously, the former case is simpler than the latter. In addition, once an acceptable solution is found for the former, the latter can in general be solved by segmenting the object into individual areas which may move with respect to one another, although each one separately moves rigidly, and then applying to the individual areas the solution of the former case.

It should be noted that the considerations described hereinabove are valid for certain type of movements, in particular rigid linear movements (both random or not). However, it will be evident that some of the considerations described hereinabove can be generalized to other types of movements, e.g., non-rigid and/or non-linear movements. In any case, a rotation of the object around an axis which is perpendicular to the line of sight of the instrument cannot be addressed in principle by this invention, because parts of the object will change shape and disappear from view during the measurement, and obviously then the measurement will be incomplete. Also cases in which there is no movement, but a chemical change in the object which has an effect on the spectrum during the measurement, are not addressed by the present invention.

As is appreciated by one ordinarily skilled in the art, solving the problem of the moving object is equivalent to calculating the Fourier transform of an interferogram defined for values which are inherently not equally spaced. This problem is known in radio astronomy (see, Synthesis Imaging (1986) Perley, Schwab and Bridle, Report of Summer School of the National Radio Astronomy Observatory, p. 72, Greenbank W. Va.), where there is clumping of data in the low OPD range, and this introduces large undulations in image intensity which make it difficult to detect weak point sources.

Many applications can be thought of for a spectral imager which is able to measure spectral images of moving objects. In previous publications [e.g., (i) Schroeck et al. (1996) Multicolor spectral karyotyping of human chromosomes. Science 273:494–497; (ii) Malik et al. (1996) Fourier transform multipixel spectroscopy for quantitative cytology. J. of Microscopy 182:133–140; (iii) Malik and Dishi (1995) ALA mediated PDT of melanoma tumors: light-sensitizer interactions determined by a novel spectral imaging system. Proceedings of optical methods for tumor treatment and detection: Mechanisms and techniques in photodynamic therapy IV, Feb. 4–5, 1995, San Jose, Calif., SPIE Vol. 2392, pp. 152–158; (iii) Malik et al. (1994) A novel spectral imaging system combining spectroscopy with imaging-application for biology. Proceedings of optical and imaging techniques in biomedicine, Sep. 8–9, 1994, Lille, France, SPIE Vol. 2329, pp. 180–184; (iv) Malik et al. (1996) Fourier transform multiplex spectroscopy and spectral imaging of photoporphyrin in single melanoma cells. Photochemistry and photobiology 63:608–614; and (v) Soenksen et al. (1996) Use of novel bio-imaging system as an imaging oximeter in intact rat brain. Proceedings of advances in laser and light spectroscopy to diagnose cancer and other diseases III, Jan. 29–30, 1996. San Jose Calif., SPIE Vol. 2679, pp. 182–189] some uses of spectral imaging in biomedical applications are taught. These include DNA analysis such as karyotyping, early diagnosis of retinal diseases and cancer detection in any tissue of a living body whose surface can be observed by conventional imaging techniques.

It is evident that various applications of many other fields will benefit from such a device. In fact, since spectroscopy is related to the interaction of light with matter, the measurement of the spectrum of light gives information on the composition of matter. Almost any medical imaging device today is built with an attachment for a video camera for real time display of the analyzed or treated tissue, and for storage of the tissue images for later retrieval and patient follow up. These include but are not limited to (i) a video camera attached to an endoscope or a microscope on an operating table, showing a surgeon the tissue being treated, and (ii) a video camera attached to a fundus camera showing an ophthalmologist the retina of the patient.

A spectral imager as taught by U.S. Pat. No. 5,539,517 is tantamount a sophisticated video camera which adds the spectral dimension to imaging, and it is built to be mechanically and optically compatible with all these biomedical imaging instruments, so that it can be readily attached to any one of them and measure the spectral image of any tissue that can be displayed with the conventional imaging methods.

Specific examples of applications are border detection of cancer of the skin, and of many internal organs such as but not limited to lungs, stomach, colon, rectum, cervix, bladder, prostate, etc., early detection of ischemia in the retina, which is a result of for example diabetes, and border detection of retinopathies, diabetic retinopathy, retinal dystrophy, glaucoma, macular degeneration, etc., and, since metabolic associated molecules such as but not limited to hemoglobin, cytochromes, flavins, nicotinamide adenine dinucleotide, nicotinamide adenine dinucleotide phosphate and the like have characteristic spectra for their reduced or oxidized forms, possible applications are also blood perfusion and vitality and/or metabolic mapping and assessment of tissue metabolic functioning through the measurement of the concentration of such chemicals.

Obviously, in the cases of a living tissue, it is generally difficult, if not impossible, to keep the analyzed tissue completely motionless. This is due to respiration, heart beat, involuntary movements of the patient, etc. Even when the tissue itself is forced to be stationary by external mechanical means (for example special holders to keep an eye stationary during corneal surgery), the mere fact that blood is circulating in the vessels induces a small movement in the examined tissue. In this case, especially when the object is magnified through a microscope. the movement of the analyzed area is also magnified.

A spectral imager with the potential of yielding such enormous amount of information to the treating doctor, would be severely limited if it could not measure at all moving objects. The present invention is therefore directed at providing a tool for spectral imaging of moving objects.

Thus, an objective of the present invention is to map in a quantitative way white light, ultraviolet or laser induced emission spectra from biological components (e.g., oxygenated and deoxygenated hemoglobin in retinal blood vessels and or melanin pigmentation level in the retina) and to distinguish cancer from healthy, or otherwise diseased tissue or cells in living organs. The signals produced by thus induced emission spectroscopy can be used to characterize different constituents of living tissues/organs. This method further enables the identification and spatial mapping of proteins, sacharides, $NAD^+$ and NADH, collagen, elastin and flavin, and various additional metabolic mediators within cells and/or tissues. Using emission light at certain wavelengths and analyzing it by various algorithms, the tissue (or cell) alkalinity or acidity, blood perfusion as well as the presence of a neoplasm in a tissue could be detected, mapped and characterized in vivo. There is a variety of laboratory systems worldwide for the detection of emitted light from living samples. Nowadays, one of the key issues in the medical field is how to analyze the resulting signals and images from these diagnostic detection systems, which key issue is addressed by the present invention.

Diabetic retinopathy is a potentially visually devastating condition that, in most cases, can be controlled with timely laser treatment [Ferris (1993) (commentary) JAMA 269:1290–1291]. The American Academy of Ophthalmology has suggested screening schedules to detect when patients develop clinical conditions which should be treated [Diabetic Retinopathy: American Academy of Ophthalmology Preferred Practice Patterns. San Francisco, Calif.: American Academy of Ophthalmology Quality of Care Committee Retinal Pane, American Academy of Ophthalmology, 1989].

However the suggested screening schedule is expensive, and for some individuals even the current expensive screening is not sufficient because patients occasionally develop severe retinopathy between scheduled examinations. In spite of this, it has been shown that this screening is cost effective

[Javitt et al. (1989) Ophthalmology 96:255–64]. This work shows that a large amount of money could be saved in health care follow up, if high and low risk patients could be more effectively identified. Therefore, any method that could increase the accuracy and reduce the cost of screening for diabetic retinopathy would be of high clinical value.

Currently, the recommended screening evaluation for diabetic retinopathy includes a detailed retinal evaluation and, in selected cases, color retinal photography [Diabetic Retinopathy: American Academy of Ophthalmology Preferred Practice Patterns. San Francisco, Calif.: American Academy of Ophthalmology Quality of Care Committee Retinal Pane, American Academy of Ophthalmology, 1989]. Fluorescein angiography of the retina is routinely performed today, but it is invasive, unpleasant, and causes occasional deaths. Furthermore, the additional information obtained by fluorescein angiography does not help categorize patients into those who may benefit from immediate laser treatment and those who will not [Ferris (1993) (commentary) JAMA 269:1290–1].

According to the present invention an interferometer based spectral imager, combined with specially developed algorithms, using spectroscopic data and imaging information at the same time and correcting the spatial and spectral information should the examined organ or tissue move during measurement, may be used to classify different stages of retinal ischemia, and therefore may prove to be useful clinical tool allowing a clinician to categorize diabetic patients as either ischemic or non-ischemic.

The oxygen supply of the retina is provided by both the choroidal and retinal circulation. The choroid serves as the oxygen source for the photoreceptors in the avascular outer retina, whereas the retinal circulation plays a crucial role in maintaining the oxygen supply to the neural elements and nerve fibers in the inner retina. Because of the high oxygen needs of the retina, any alteration in circulation such as seen in diabetic retinopathy, hypertension, sickle cell disease, and vascular occlusive diseases results in functional impairment and extensive retinal tissue.

Noninvasive measurements of the oxygen saturation of blood in retinal vessels was first proposed by Hickham et al. [Hickham et al. (1963) Circulation 27:375] using a two-wavelength photographic technique (560 and 640 nm) for retinal vessels crossing the optical disk (the region where the optic nerve connects to the retina). A more advanced approach based on the three wavelength method of Pittman and Duling is presented in Delori (1988) Applied Optics 27:1 113–1125.

An interferometer based spectral imager as taught in U.S. Pat. No. 5,539,517, combined with the method of the present invention which enable spatial registration and spectral correction, or in other words compensating both spatially and spectrally for movements of the examined object, based on the spectral information that it provides, not only may enable noninvasive evaluation of the oxygen saturation level of hemoglobin in retinal blood vessels, but also, because of the imaging information that it provides, it may be used for the detection and mapping of retinal ischemia. Joined to advanced spectral analysis algorithms such as but not limited to principal component or neural network algorithms, it may also prove useful for classification of the different retinopathy stages, and treatment categorization of for example diabetic patients.

Many chemicals in the living tissue are related to the functioning of the vessels and to metabolism. Therefore, even though the primary element for retinal ischemia is oxygen, which can be measured through the concentration of hemoglobin in the oxy- and deoxy forms, important information can be obtained also by measuring the concentration of other constituents, such as $NAD^+$, NADH, flavin, cytochromes, etc.

Considering the large amount of prior art that has been described for spectral detection of such chemical constituents of tissue, correlating the absorption peaks in reflectance, and the fluorescence peaks in UV or blue light, single or multiple wavelengths excitation, to their concentrations, it is conceived that an interferometer based spectral imager as taught by U.S. Pat. No. 5,539,517, combined with the method of the present invention may be used to map concentrations of one or more of such constituents simultaneously in living non-motionless organs/tissues. The particular hardware configuration in which the imager will be operated, will dictate the type and amount of information obtained.

For example, the simplest and most straightforward configuration is when the imager is attached to the CCD port of a fundus camera, so that the retina is imaged, and the same wide band white light source of the fundus camera is used to measure the reflected light from the retina. In this case oxygen concentrations can be measured using Delori's algorithm [Delori (1995) Appl. Optics 27:1113–1188, and Appl Optics, Vol. 28, 1061; and, Delori et al. (1980) Vision Research 20:1099], or similar, extended to all pixels of the imaged retina. More complicated systems based on interferometer based spectral imagers are: (i) auto-fluorescence spectral imaging; (ii) spectral imaging using UV or blue light fluorescence excitation; (iii) spectral imaging using laser excited fluorescence, singly, simultaneously, or in succession, at the following wavelengths: 650, 442, 378, 337, 325, 400, 448, 308, 378, 370, 355, or any other equivalent wavelengths which give similar information.

These configurations can be built in several ways, either separately or combined in any number of combinations in the same instrument: the instrument is made of the light source(s), the fundus camera and the spectral imager, including a computer and software to interpret the data and display it in a useful way for the ophthalmologist.

In all cases of white light reflection, auto-fluorescence, single wavelength continuous wave laser excitation fluorescence, or multiple wavelength laser excitation fluorescence, the sample is illuminated and a spectral image is measured.

In the case of pulsed laser illumination, the method of work of the spectral imager is slightly modified and requires some hardware changes which are not basic and substantial, but important for the instrument to operate. These changes are the following.

For single pulsed laser excited fluorescence spectral imaging, the laser pulses and the frame grabbing of the CCD of the imager are synchronized with the scanning angle of the interferometer, so that at each pulse the interferometer performs a step, and a new frame is collected by the computer (several pulses can also be used in general for each frame, as long as this number does not change from frame to frame). In this way, at each OPD value, the interferogram value corresponds to the same number (but different) of pulses of the laser. This is necessary to ensure that each frame is taken with the same total illumination intensity, otherwise, each frame measures the fluorescence resulting from a different number of laser pulses and the interferogram will be distorted.

For several pulsed lasers induced fluorescence spectral imaging, the method of work can be in two ways: (i) collect a whole spectral cube for each laser separately as above, in succession; this means that during a measurement only one laser is activated, and at the end there is one spectral cube measured for each laser wavelength; and, (ii) pulse each laser in succession in synchronization with the interferometer and the frame grabbing, so that all the lasers are switched in succession before the next step of the interferometer and the next frame is taken; in this case, at the end, only one spectral cube is measured.

All the information must be analyzed and interpreted. The most important algorithms are going to be of a type that compares the resulting intensities between different wavelengths and between different pixels of the image. These algorithms is should consider variations of intensities, and ratios between different regions in the tissue and between different wavelengths. The method will be very sensitive, and may replace slit lamp imaging (white light or filtered light), because it will provide a large quantitative information.

Other applications will be apparent to one ordinarily skilled in the art. These include visual loss due to choroidal ischemia, acute sectorial choroidal ischemia, ischemic optic neuropathy, corneal and iris problems, etc., and many others which are analyzed today by imaging techniques, either using white light or fluorescence of different origins.

Since the spectral imagers according to U.S. Pat. No. 5,539,517 can be attached to any imaging optics including endoscopes and laparoscopes, it may be used as an aid to the surgeon before, during or after surgery to accurately define the diseased tissue to be removed, to aid in the decision where to start cutting, where to stop, and to judge whether all diseased tissue has been removed during an operation procedure. These spectral imagers are intrinsically suitable to analyze the nature of the tissue through the chemical composition, related in turn to its spectral characteristics, and to provide a visual map (usually enhanced), for a user to grasp, take decisions and act.

In the case of cancerous tissues detection in vivo, both the hardware configurations and the types of analysis and display algorithms involved are very similar to the above described ophthalmologic examples. The differences are in the collecting optics (endoscopes of different types instead of for example a fundus camera), in the types of some basic molecular components involved in the detection: some of these are probably common, such as oxygen concentration, additional others are collagen and elastin, genetic material in the cell nuclei, such as DNA chromatin, etc. The illumination and synchronization requirements in the case of multiple wavelengths or pulsed excitation are similar as well [Pitris et al. Paper presented at European Biomedical Optics Week by SPIE, Sep. 12–16, 1995, Barcelona Spain].

In all these examples spatial registration and spectral correction are required and are provided by the method according to the present invention.

Additional objects, advantages, and novel features of the method according to the present invention will become apparent to one ordinarily skilled in the art upon examination of the following examples, which are not intended to be limiting.

EXAMPLE 1

Spatial Registration and Spectral Correction—the Effect on the Image

Figure 3A:
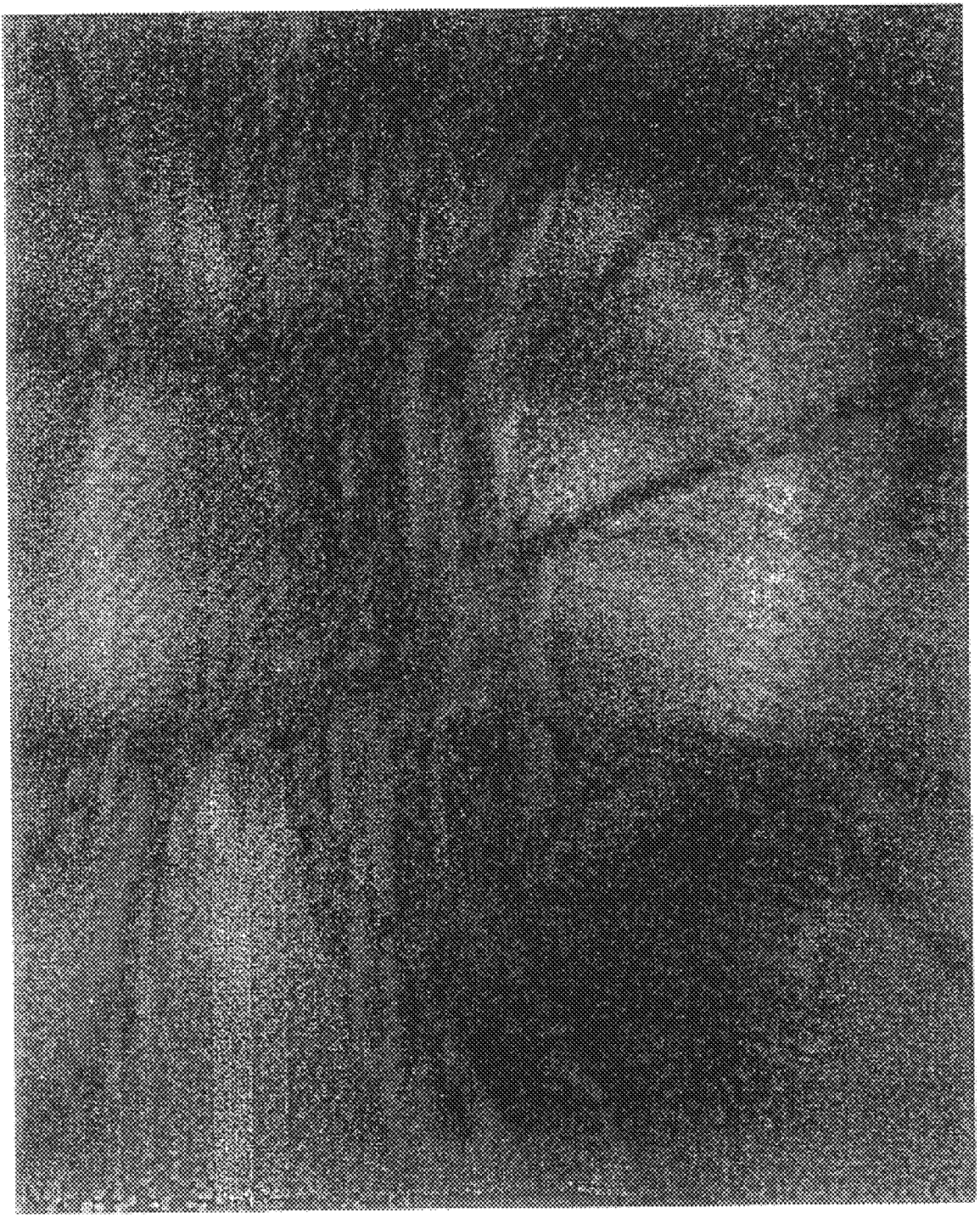
FIG. 3a is a spectral image of a human right eye acquired using the SpectraCube™ system.
Figure 3B:
FIG. 3b is a spectral image of the human right eye of FIG. 3a after spatial registration and spectral correction, employing the method of the present invention.

With reference now to FIGS. 3a and 3b. FIG. 3a presents a spectral image of the optic disc of the retina of a right eye of a healthy individual using the SpectraCube™ system, while not employing spatial registration and spectral correction procedures as described in accordance with the method of the present invention. FIG. 3b, on the other hand, presents the very same image after spatial registration and spectral correction procedures according to the present invention.

In both images the optic disc appears lighter in the middle portion of the image along with blood vessels nourishing the optical nerve with oxygen and other nutrients (arterioles) and removing waste and carbon dioxide generated during metabolism (veins). However, as is clearly evident comparing the two images, due to movements of the eye during measurement, the image of FIG. 3a is highly blurred. Corrective action according to the method of the present invention, in which spatial registration and spectral correction were applied, resulted in a much clearer image as shown in FIG. 3b.

Furthermore, the images presented in FIGS. 3a and 3b show not only the spatial organization of the tissue, as they also present spectral information. although not in a direct fashion. In other words, the different colors present in the images result from the application of an RGB algorithm to the spectrum of each pixel of the image such that each pixel, according to its spectrum and according to the preselected RGB function is presented by RGB colors in corresponding intensities. It is clear that as a result of the distorted spectra associated with pixels of the image shown in FIG. 3a, as is further demonstrated in Examples 2 and 3 hereinbelow, the RGB function yields different results when applied to either image.

This Example emphasizes the importance of spatial registration and spectral correction to obtain clear and informative image of the examined moving object, the eye in the present case.

The following examples demonstrate specifically the importance of spectral correction to obtain meaningful spectral information from selected regions of the examined object, which information may be employed to achieve information about the metabolic condition of an examined tissue, etc.

EXAMPLE 2

Spectral Correction—the Effect on the Interferogram

Figure 4A:
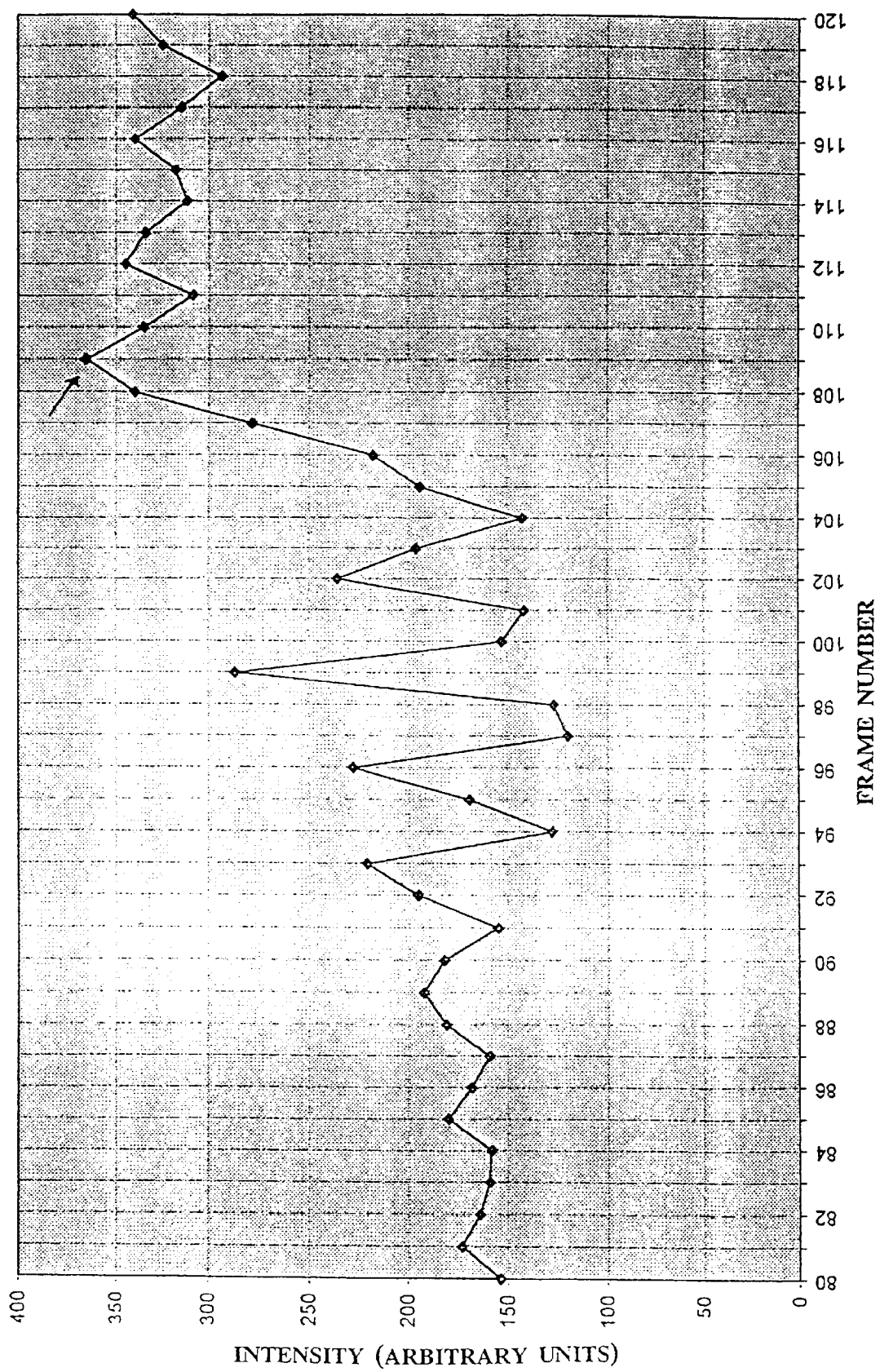
Figure 4B:
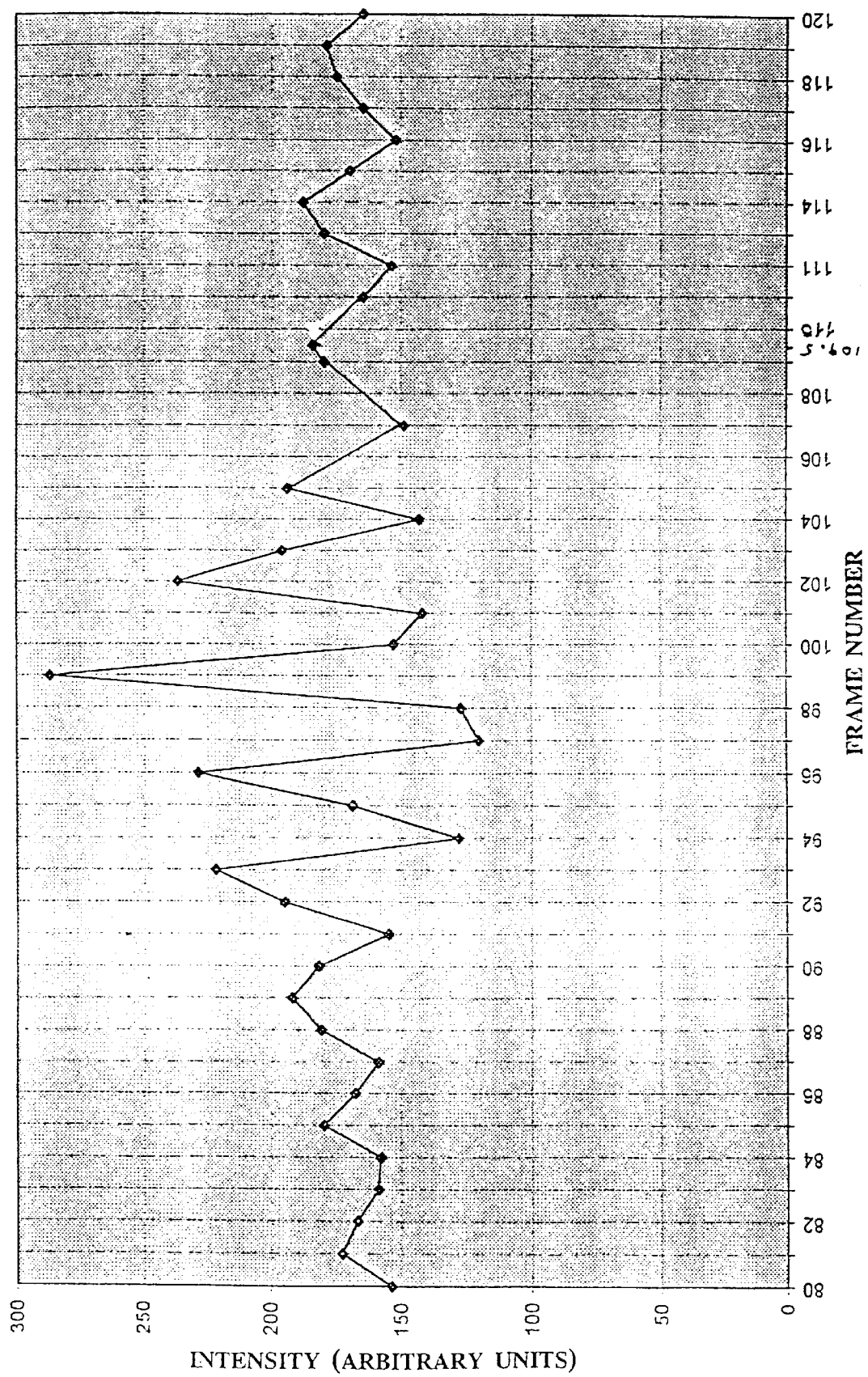
FIG. 4b presents a portion of an interferogram function of the same pixel of FIG. 4a, which pixel is derived from the spectral image of FIG. 3b.

With reference now to FIGS. 4a and 4b. FIG. 4a presents a portion of an interferogram calculated for a single pixel (x=112, y=151) of the image presented in FIG. 3a, i.e., while not employing spatial registration and spectral correction procedures as described in accordance with the method of the present invention. FIG. 3b, on the other hand, presents the corresponding portion of an interferogram of the very same pixel after spatial registration and spectral correction procedures according to the present invention.

Examining the interferogram of FIG. 3a reveals that the left and central parts of the function (measured in equal intervals of time) resembles a typical interferogram, whereas the right portion of the function, is totally atypical. The local maximum indicated by an arrow is due to sudden motion of the examined object (e.g., a saccadic motion of the eye). The uncharacteristic increase of signal is due to the fact that a different point in the object being measured suddenly appeared not in its original place, giving a different value for the interferogram function, as compared with a situation wherein the object remains stationary.

Nevertheless after spatial registration and spectral correction procedures according to the present invention are applied, as shown in FIG. 4b, the interferogram function of the same pixel appears typical.

As can be seen in FIG. 4b, the corrected interferogram is well behaved. It does not have spurious discontinuities or uncharacteristic portions characterizing the non-corrected interferogram of FIG. 4a.

However, the corrected interferogram of FIG. 4b is now defined in nonuniform intervals. For example one notices that around frame number 107 the density of data is low, meaning that the eye moved in a direction opposite to the scanning direction of the interferometer, increasing the OPD intervals around it. whereas around frame number 109.5, which is an artificial frame number formed due to the magnitude of movement of the eye in the same direction as the scanning direction of the interferometer, the density of data is higher, decreasing the OPD intervals around it.

There are therefore, several routes by which one can perform the Fourier integral to approximate the physical spectrum of the specific pixel. According to one route one can interpolate between the given OPD values and then define a new interferogram having equally spaced OPD values, thus allowing use of a fast Fourier transform algorithm to approximate the physical spectrum of that pixel. According to another route, one can calculate the Fourier integral as the sum of the interferogram values weighted according to their own intervals using Equation (3):

$$f(\sigma) = 1/K \cdot \Sigma F(x_i) \Delta_i e^{(i\sigma x_i)} \quad (3)$$

where K is a constant, $f(\sigma)$ is the value of the spectrum at wavelength $\lambda = 1/\sigma$, and $\Delta_i$ is the difference between the OPD at $x_i$ and the OPD at $x_{i+1}$. It will be apparent to one ordinarily skilled in the art, that there may be additional ways to approximate the physical spectrum, such as methods as described in Synthesis Imaging (1986) Perley, Schwab and Bridle, Report of Summer School of the National Radio Astronomy Observatory, p. 72, Greenbank W. Va.

EXAMPLE 3

Spectral Correction—the Effect on the Spectrum

Figure 5A:
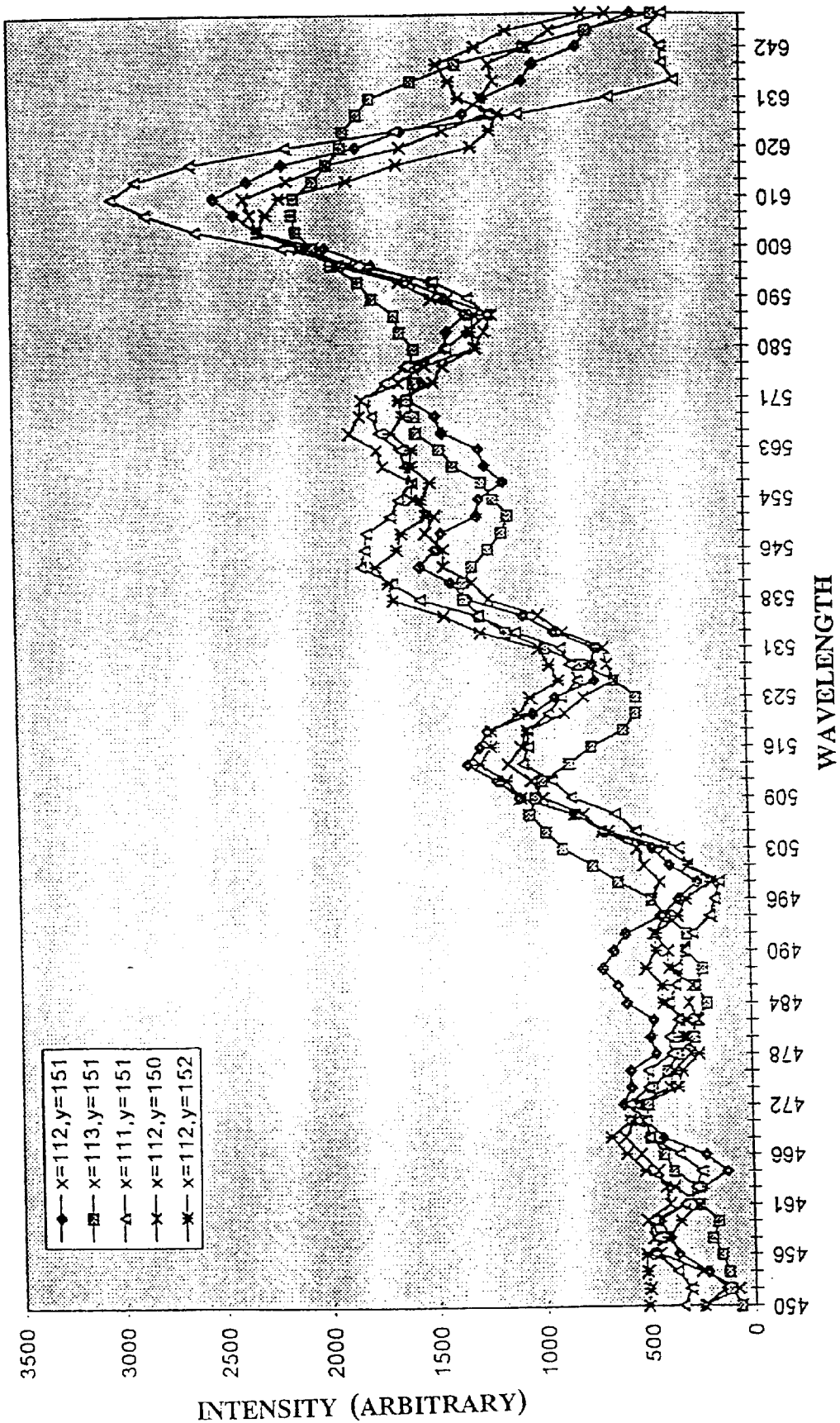
FIG. 5a presents spectra of five adjacent pixels derived from the spectral image of FIG. 3a, the position of each pixel is indicated.
Figure 5B:
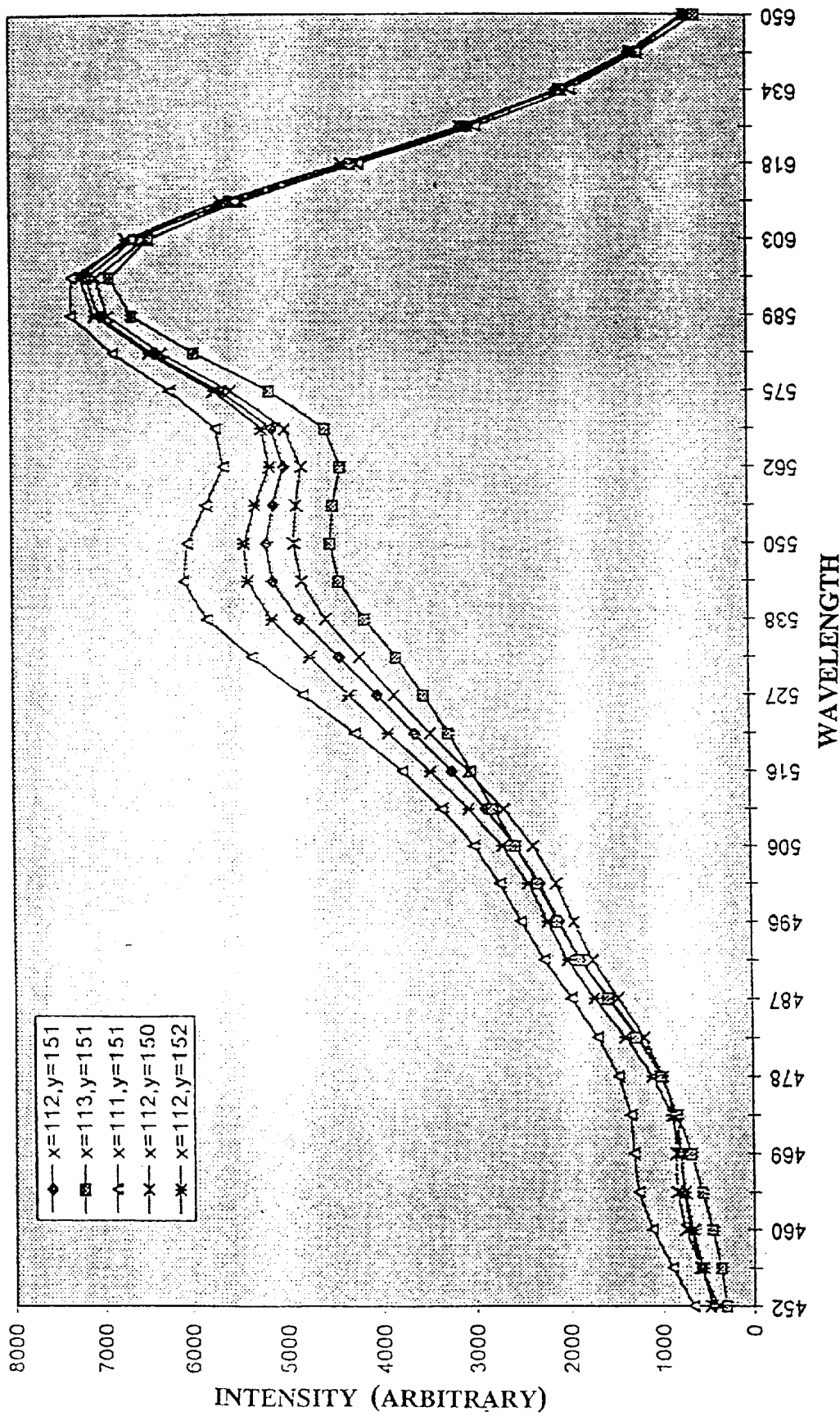
FIG. 5b presents spectra of five adjacent pixels derived from the spectral image of FIG. 3b, the position of each pixel is indicated.

With reference now to FIGS. 5a and 5b. FIG. 5a presents spectra of five adjacent pixels derived from the image of FIG. 3a, while not employing spatial registration and spectral correction procedures as described in accordance with the method of the present invention. Four of these pixels are centered around the fifth which is the pixel whose interferogram is shown in FIG. 4a. FIG. 5b, on the other hand, presents spectra of the same five pixels after application of the spatial registration and spectral correction procedures according to the present invention. The dip around 575 nm is characteristic of oxyhemoglobin absorption.

Comparing the spectra of FIGS. 5a and 5b, one notices two phenomena. First, corresponding spectra are much noisier in FIG. 5a as compared with FIG. 5b. Second, when implementing the method of the present invention, as shown in FIG. 5b, from pixel to pixel the spectra change in a uniform pattern presenting an expected smooth behavior over the entire spectral range, whereas none such behavior can be seen in the spectra of FIG. 5a.

Thus, examples 2 and 3 emphasize the importance of spectral correction to obtain meaningful interferograms and spectra derived from an examined moving object.

EXAMPLE 4

Spatial Registration of Frames Assisted by Fringe Suppression

The raw data of a randomly moving object as measured by an interferometric spectral imager, should be preprocessed before the Fourier Transform is calculated on the pixels interferograms to obtain the best final spectral cube.

This is due to the fact that in a spectral imager based on a Sagnac or similar type interferometer as herein described, the instantaneous Optical Path Difference (OPD) corresponding to an interferogram data point depends not only on the specific CCD frame but also on the specific pixel to which that data point refers.

As a result, if the object moves during the measurement, the pixel occupied by a point on the object is different than if the object is stationary, and if no correction is used, the Fourier Transform algorithm uses the wrong OPD for that data point. The resultant spectral image cube can be significantly corrected if by some means the algorithm is made to use the appropriate OPD for each data point instead of the inappropriate one. Finding the appropriate OPD for each interferogram data point requires (i) spatial registration of each acquired frame and recording of its registration vector; and (ii) calculation of the actual OPD for each data point, based on the registration vectors and on the OPD dependence on position.

Figure 6A:
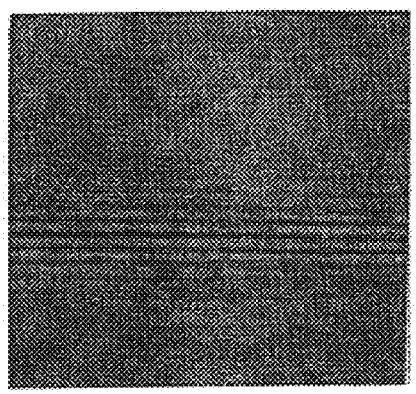
FIGS. 6a–f present the operation of a fringes suppression algorithm according to the present invention.

However, there is one physical phenomenon, the appearance of fringes, which makes the frame registration more difficult, yet not impossible, when performing this registration automatically. As shown in FIG. 6a, fringes are straight line stripes of intensity modulation superimposed on the frame, which slightly change position, with respect to the frame on which they appear, depending on the scanning position of the interferometer. The origin of the stripes is due to constructive (light stripes) and destructive (dark stripes) interference of the light rays while passing through the interferometer, and their shape (vertical or horizontal straight lines, depending on optical alignment) is due to the fact that all the pixels on a vertical line (or horizontal, respectively) go through the same OPD for every scanned frame, so that they undergo the same amount of interference (for the same wavelength of light). The change in position from frame to frame is due to the fact that the constructive or destructive level of interference for a certain pixel changes according to the interferometer position while scanning. The stripes are not very bothersome when registering the scanned frames by eye one on top of the other, because despite the fringes, the other features (e.g., patterns of blood vessels in the eye) are well visible in each frame, and the appearance of the stripes does not prevent an observer, when superimposing one frame over the other, from deciding the best spatial registration. However, when using an automatic algorithm, these stripes may introduce a difficulty, because they represent a nonuniform light intensity change, superimposed on the features of the frame. As already mentioned, the fringes are vertical (or horizontal) stripes which travel in position from frame to frame in a direction perpendicular to the stripes, in unison with the interferometer mirror(s) rotation.

The input of the fringe suppression algorithm is the cube of interferogram frames with fringes and the output a cube of frames without fringes, as further described hereinbelow.

Few assumptions are made concerning the operation of the fringes suppression algorithm. One assumption is that the fringe "frequency" is approximately known. In other words, it is assumed that the distance in pixels between adjacent fringes is approximately known. One may gain this knowledge from previous experience on a certain type of sample, from each of the frames of the interferogram cubes themselves, or from a calibration process.

As seen in FIG. 6a, the fringe information is very compactly located in the frequency domain. The center frequency of the fringe can be easily found and the width of the fringe information in the frequency domain is assumed to be constant or nearly constant for all of the scanned frames.

The fringes suppression algorithm therefore suppresses the fringes by artificially zeroing or interpolating out the signal in the frequency range of the spatial frequency domain where the fringes information lies, for each scanned frame.

Figure 6B:
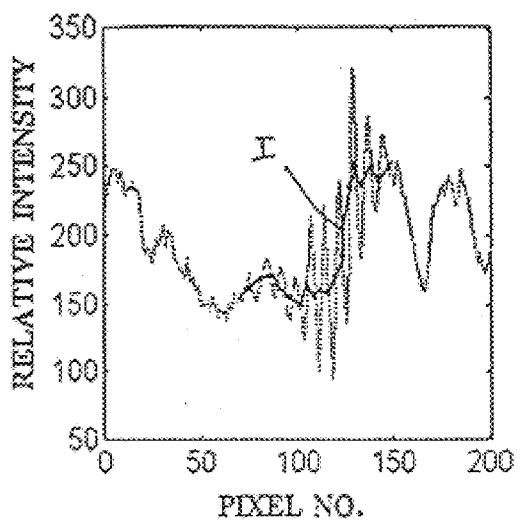
Figure 6C:
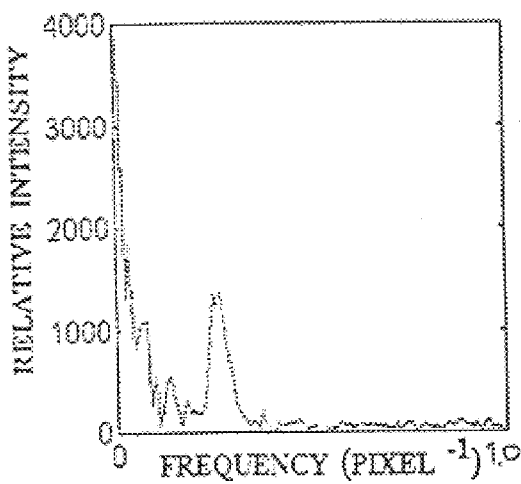
Figure 6D:
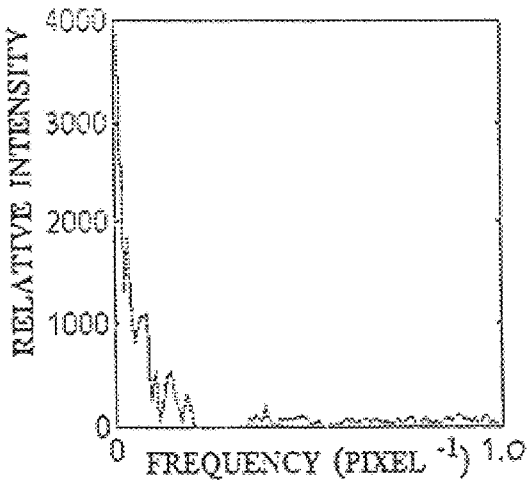
Figure 6E:
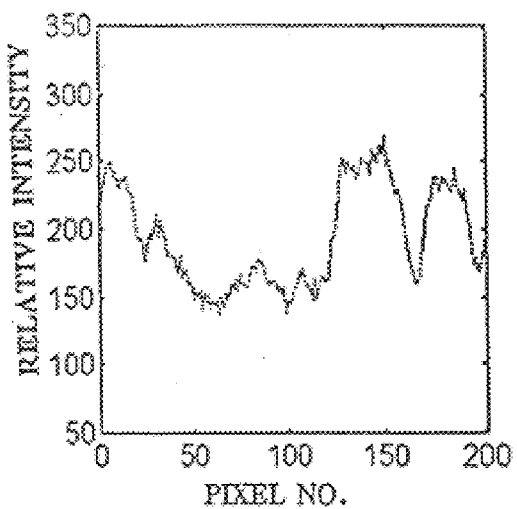
Figure 6F:
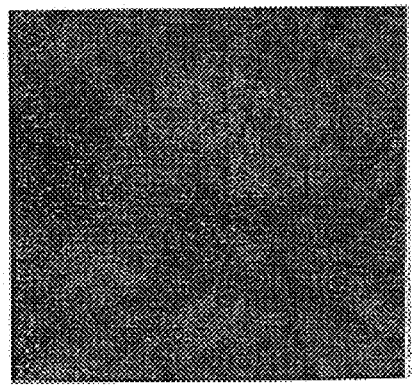

Since the fringes are almost parallel to one of the axes (say x-axis), one can divide the frame into vectors along the axis that is perpendicular to the fringes (say y-axis). FIG. 6b shows the intensity of 200 pixels of such a vector, wherein the fringes are clearly evident between the 100th pixel and the 150th pixel. As shown in FIG. 6c, each vector is thereafter transformed to the frequency domain using, for example, the fast Fourier transform algorithm (FFT), the peak ranging from ca. 0.15 to ca. 0.35 pixel$^{-1}$ contains the fringe information. As shown in FIG. 6d, for each vector the frequency region where the fringe information is located is zeroed, and, as shown in FIG. 6e, transform back to the spatial domain using, for example, inverse fast Fourier transform algorithm (IFFT). This procedure is performed for each of the vectors of every frame grabbed by the spectral imager while scanning the interferometer and results in a fringes suppressed frame, as shown in FIG. 6f.

Should for some reason the fringes be offset angularly, i.e., not arranged in exact vertical or horizontal direction, a small decrease in the frequency of the fringe information band will result. This problem can be solved by increasing the width of the region of zeroing or interpolation of the signal in the spatial frequency domain where the fringe information lies.

As is evident from FIG. 6c, most of the frame's energy is located in the lower bands in the frequency domain. Using a band-stop filter not only preserves the information in each scanned frame but also doesn't blur the frame since the energy in the higher bands is not attenuated, and the edge information is preserved.

It will be appreciated by one ordinarily skilled in the art that using the Hough transform [Paul V. C. Hough, "Methods and means for recognizing complex patterns"; and U.S. Pat. No. 3,069,654, both are incorporated by reference as if fully set forth herein], one can extract the frequency position of the fringe information and use it for the fringe suppression algorithm. The Hough transform can also find the orientation of those fringes and make the necessary adjustments.

To keep the signal real after the IFFT, the zeroing procedure is performed preferably symmetrically relative to the origin of the spatial frequency axis (Even though not shown in the Figure, the signal in the frequency domain is defined for both positive and negative values of the frequency f, and it is an even or symmetric function of f). The signal after the IFFT, as shown in FIG. 6e, has a very small imaginary residual part that is eliminated using the absolute (or the real) part of the result.

Returning to FIGS. 6b and 6e, instead of executing the FFP, zeroing and IFFT procedures as hereinabove described, one can simply interpolate the plot of FIG. 6b through the fringes region, intersecting each of the fringes intensity peaks substantially at their central relative intensity to obtain an interpolated plot, as indicated by I (for intersecting) in FIG. 6b, which is otherwise very similar to that shown in FIG. 6e.

An additional option is, for the region where the fringes information lies in the spatial frequency domain, instead of zeroing the peak (as shown in FIG. 6e), draw a straight line interpolation between the edge points of the peak.

The preferred fringe suppression algorithm according to the present invention is hereinbelow described in mathematical terms.

Let X(x,y) be the input frame (as, for example, shown in FIG. 6a), Y(x,y) the corresponding output frame (as, for example, shown in FIG. 6a), x and y are the discrete coordinates of a pixel in the frame, $f_{CF}$ the center frequency of the fringe information, $f_{LF}$ the low frequency of the fringe information, $f_{HF}$ the high frequency of the fringe information, $\Delta_f$ the width of the fringe suppression band and u(f) a step function.

By definition:

$$f_{LF}=f_{CF}-0.5\Delta_f \quad (4)$$

$$f_{HF}=f_{CF}+0.5\Delta_f \quad (5)$$

A "zeroing band" function is defined as:

$$W(f)=\{1-[u(f-f_{LF})-u(f-f_{HF})]-[u(f+f_{LF})-u(f+f_{HF})]\} \quad (6)$$

W(f) (the "zeroing band" function) is defined as a function of the frequency f such that, when multiplied by another function of the frequency f, it leaves it unaltered for values of f lower than $f_{LF}$ and higher than $f_{HF}$, and changes it to zero for values of f higher than $f_{LF}$ and lower than $f_{HF}$.

The output frame without fringes can then be expressed as:

$$Y(x,y)=Re\{IFFT\{W(f)*FFT\{X(:,y)\}\}\} \quad (7)$$

Using the fringe suppressed frames will assist in automatic registration procedures, which otherwise may face difficulties due to the repetitive pattern of the fringes superimposed on the frames.

While the invention has been described with respect to a limited number of embodiments, it will be appreciated that many variations, modifications and other applications of the invention may be made.

What is claimed is:

1. A method for spectral imaging of a moving object comprising the steps of:
   (a) using an interferometer based spectral imager for acquiring spatial and spectral information of the moving object; and
   (b) correcting said spatial and spectral information for movements of the moving object via a spatial registration and spectral correction procedures for obtaining corrected spatial and spectral information.

2. A method as in claim 1, further comprising the step of:
   (c) presenting said corrected spatial and spectral information as an image.

3. A method as in claim 2, wherein said presentation is an RGB display of said corrected spectral information according to said corrected spatial information.

4. A method as in claim 1, wherein said acquisition of spatial and spectral information is effected by:
   (a) collecting incident light from the moving object;
   (b) passing said collected light through said interferometer which outputs modulated light corresponding to a predetermined set of linear combinations of the spectral intensity of the light emitted from each pixel of the moving object;
   (c) focusing light outputted from said interferometer on a detector array;
   (d) scanning the optical path difference generated in the interferometer for all said pixels of said moving object independently and simultaneously; and (e) processing the outputs of said detector array, to determine the spectrum of each of said pixels of the moving object.

5. A method as in claim 1, wherein said spatial registration and spectral correction procedures for obtaining said corrected spatial and spectral information are effected by selecting a reference frame of said moving object, using said reference frame of the moving object for calculating a translation vector for any other frames of the moving object and using said translation vectors for effecting said spatial registration and spectral correction procedures.

6. A method as in claim 5, wherein said calculation is effected by overlapping said reference frame with any of said other frames to find a position in which an intensity subtraction procedure yields a substantially featureless subtraction image.

7. A method as in claim 1, wherein the moving object moves substantially only along a first direction, and said interferometer is of a type in which the optical path difference in a frame varies along a single direction, the method further comprising the step of:

(c) positioning said spectral imager with respect to the moving object such that its optical path difference gradient is perpendicular to said first direction.

8. A method as in claim 1, wherein the moving object is a living organ or a portion thereof.

9. A method as in claim 8, wherein said living organ is an eye.

10. A method for spectral imaging of a moving object comprising the steps of:

(a) aligning and focusing an interferometer based spectral imager with respect to the moving object;

(b) scanning said interferometer while acquiring and storing successive frames of the moving object by a detector array, so that successive optical path differences of said interferometer are inherently not equally spaced due to movements of the moving object;

(c) ordering collected data of each of said successive frames for every pixel of the moving object into an interferogram function, while at the same time, calculating a spatial translation vector of each of said successive frames with respect to one of said successive frames which is taken as a reference frame, such that the actual optical path difference for every pixel in each of said successive frames is found;

(d) calculating a complex Fourier transform for each pixel of said object by applying a straightforward Fourier transform algorithm to each of said interferograms; and (e) calculating a spectrum for every pixel of the moving object.

11. A method as in claim 10, further comprising the step of presenting an image of said moving object.

12. A method as in claim 11, wherein said presentation is an RGB display of said calculated spectra.

13. A method as in claim 10, wherein said calculation of said spatial translation vector of each of said successive frames with respect to one of said successive frames which is taken as said reference frame is effected by overlapping said reference frame with any of said other frames to find a position in which an intensity subtraction procedure yields a substantially featureless subtraction image.

14. A method as in claim 10, wherein the moving object moves substantially only along a first direction, and said interferometer is of a type in which said optical path difference in a frame varies along a single direction, the method further comprising the step of positioning said spectral imager with respect to the moving object such that its optical path difference gradient is perpendicular to said first direction.

15. A method as in claim 10, wherein the moving object is a living organ or a portion thereof.

16. A method as in claim 15, wherein said living organ is an eye.

17. A method for spectral imaging of a moving object comprising the steps of:

(a) aligning and focusing an interferometer based spectral imager with respect to the moving object;

(b) scanning said interferometer while acquiring and storing successive frames of the moving object by a detector array, so that successive optical path differences of said interferometer are inherently not equally spaced due to movements of the moving object;

(c) ordering collected data of each of said successive frames for every pixel of the moving object into an interferogram function while at the same time calculating a spatial translation vector of each of said successive frames with respect to one of said successive frames which is taken as a reference frame, such that the actual optical path difference for every pixel in each of said successive frames is found;

(d) interpolating said interferogram of each of said pixels of said moving object to achieve equally spaced optical path difference values;

(e) calculating a complex Fourier transform for each of said pixels of said moving object by applying a fast Fourier transform algorithm to each of said interferograms; and (f) calculating a spectrum for every pixel of the moving object.

18. A method as in claim 17, further comprising the step of presenting an image of said moving object.

19. A method as in claim 18, wherein said presentation is an RGB display of said calculated spectra.

20. A method as in claim 17, wherein said calculation of said spatial translation vector of each of said successive frames with respect to one of said successive frames which is taken as a reference frame is effected by overlapping said reference frame with any of said other frames to find a position in which an intensity subtraction procedure yields a substantially featureless subtraction image.

21. A method as in claim 17, wherein the moving object moves substantially only along a first direction, and said interferometer is of a type in which said optical path difference in a frame varies along a single direction, the method further comprising the step of positioning said spectral imager with respect to the moving object such that its optical path difference gradient is perpendicular to said first direction.

22. A method as in claim 17, wherein the moving object is a living organ or a portion thereof.

23. A method as in claim 22, wherein said living organ is an eye.

24. A method as in claim 1, wherein said spatial registration procedure is effected using a fringe suppression algorithm.

* * * * *